United States Patent
Huelsen

(10) Patent No.: US 12,319,245 B2
(45) Date of Patent: Jun. 3, 2025

(54) ROOF MODULE FOR FORMING A VEHICLE ROOF COMPRISING A CLEANING DEVICE AND METHOD FOR CLEANING A SEE-THROUGH AREA

(71) Applicant: Webasto SE, Stockdorf (DE)

(72) Inventor: Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 432 days.

(21) Appl. No.: 17/981,079

(22) Filed: Nov. 4, 2022

(65) Prior Publication Data

US 2023/0144240 A1  May 11, 2023

(30) Foreign Application Priority Data

Nov. 11, 2021 (DE) ..................... 10 2021 129 389.8

(51) Int. Cl.
| | |
|---|---|
| *B60S 1/48* | (2006.01) |
| *B60S 1/56* | (2006.01) |
| *B62D 25/06* | (2006.01) |
| *G06V 20/56* | (2022.01) |
| *B60S 1/52* | (2006.01) |

(52) U.S. Cl.
CPC . *B60S 1/56* (2013.01); *B60S 1/48* (2013.01); *B62D 25/06* (2013.01); *G06V 20/56* (2022.01); *B60S 1/52* (2013.01)

(58) Field of Classification Search
CPC ..... B60S 1/56; B60S 1/48; B60S 1/52; G06V 20/56; B62D 25/06
See application file for complete search history.

(56) References Cited

U.S. PATENT DOCUMENTS

| | | |
|---|---|---|
| 6,782,793 B1 | 8/2004 | Lloyd |
| 7,077,049 B2 | 7/2006 | Shumov |
| 8,757,551 B2 | 6/2014 | Margalit |
| 8,881,636 B2 | 11/2014 | Hyde et al. |
| 2011/0266375 A1 | 11/2011 | Ono et al. |
| 2014/0102288 A1 | 4/2014 | Yeshurun et al. |
| 2019/0039575 A1 | 2/2019 | Hansen et al. |
| 2020/0108801 A1 | 4/2020 | Frederick et al. |

FOREIGN PATENT DOCUMENTS

| | | |
|---|---|---|
| DE | 102011017684 A1 | 11/2011 |
| DE | 102017205967 A1 | 10/2018 |
| DE | 102018118846 A1 | 2/2019 |
| WO | 2015166483 A1 | 11/2015 |

*Primary Examiner* — Mathew Franklin Gordon
(74) *Attorney, Agent, or Firm* — Fitch, Even, Tabin & Flannery, LLP

(57) ABSTRACT

The invention relates to a roof module for forming a vehicle roof (100) on a motor vehicle, the roof module comprising a panel component (12) which at least partially forms a roof skin (14) of the vehicle roof (100) and serves as an outer sealing surface of the roof module (10), at least one sensor module (15) comprising a controller (27) and at least one environment sensor (16) configured to send and/or receive electromagnetic signals through a see-through area (20) in order to detect a vehicle environment, and at least one cleaning device (23) comprising at least one cleaning nozzle (24) configured to clean the see-through area (20). The at least one environment sensor (16) is configured to detect at least one object (28) moving toward the see-through area (20) in the form of image data, and the controller (27) is configured to generate at least one object information from the image data and to prompt the at least one cleaning nozzle (24) to discharge a cleaning fluid based thereon.

14 Claims, 2 Drawing Sheets

ROOF MODULE FOR FORMING A VEHICLE ROOF COMPRISING A CLEANING DEVICE AND METHOD FOR CLEANING A SEE-THROUGH AREA

CROSS-REFERENCE TO RELATED APPLICATION

This application claims priority from German patent application no. 10 2021 129 389.8 filed on Nov. 11, 2021, which is hereby incorporated herein by reference in its entirety for all purposes.

FIELD

The invention relates to a roof module for forming a vehicle roof on a motor vehicle according to the preamble of claim 1. Furthermore, the invention relates to a method for cleaning a see-through area of an environment sensor comprised in a roof module for forming a vehicle roof of a motor vehicle according to claim 14.

BACKGROUND

Generic roof modules are widely used in vehicle manufacturing since these roof modules can be prefabricated as separate functional modules and can be delivered to the assembly line when assembling the vehicle. The roof module at least partially forms a roof skin of the vehicle roof at its outer surface, the roof skin preventing moisture and air flows from entering the vehicle interior. The roof skin is composed of one or more panel components, which can be made of a stable material, such as painted metal or painted or died-through plastic. The roof module can be a part of a fixed vehicle roof or a part of an openable roof sub-assembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of von environment sensors (e.g., lidar sensors, radar sensors, (multi-)cameras, etc. including other (electrical) components) are employed, which are integrated in the roof module, for example, and which detect the environment surrounding the motor vehicle and determine, for example, a current traffic situation from the detected environment data. Roof modules which are equipped with a plurality of environment sensors are also known as roof sensor modules (RSM). For this purpose, the known environment sensors send and/or receive suitable electromagnetic signals, such as laser beams or radar beams, allowing a data model of the vehicle environment to be generated by suitable signal evaluation and to be used for controlling the vehicle.

The environment sensors for monitoring and detecting the vehicle environment are typically mounted on the vehicle roof since the vehicle roof is typically the highest point of a vehicle, from where the vehicle environment is easily visible. The environment sensors are typically placed on top of the panel component of the roof module, which forms the roof skin, as attachments; alternatively, they can also be disposed in an opening of the roof module and be adjustable between a retracted position and a deployed position. As continuous an availability of the environment sensors as possible is of great importance for a best possible operation, safety and availability of an autonomous or semi-autonomous driving mode.

During the use of the environment sensor, however, ambient conditions (e.g., weather or collisions with insects) pose the risk that a ((partially) transparent) see-through area, through which the environment sensor detects the vehicle environment, accumulates dirt, i.e., becomes at least partially opaque to the environment sensor. For cleaning the see-through area, the use of cleaning nozzles by means of which the see-through area can be cleaned in general is known. Similar to spray nozzles of a windshield wiper system of a rear window or a windshield, the known cleaning nozzles are typically disposed statically or in a retractable and deployable manner in an area of the roof module or the panel component. The cleaning nozzles are typically positioned in such a manner relative to the see-through area that they are located in front of the environment sensor and ideally outside of its field of view with respect to an optical axis of the environment sensor so that the environment sensor does not perceive them as a disturbance, if possible.

However, cleaning devices to date do not enable a sufficient and continuous availability of such an environment sensor since they cannot effectively clean such a see-through area in every situation depending on the type of dirt and the amount of dirt. In particular, known cleaning devices do not yet enable an effective cleaning or ridding of the see-through area from insects, dirt, mud and/or snow (slush) since cleaning typically does not take place until the accumulation of dirt reaches a stage in which the dirt particle and/or the insect is already stuck to the see-through area and can no longer be removed by the cleaning nozzles. This is particularly disadvantageous since stuck dirt particles on such a see-through area each pose optical disturbances in a segment of the field of view of the environment sensor. Consequently, the environment sensor can no longer detect the vehicle environment without interference and is therefore limited in its function and availability. This disrupted state can often be remedied only by cleaning the see-through area in question manually or in a car wash. However, this requires time and work. Insects, in particular, are a challenge since a collision with insects, which entails a quick drying or coagulation and an adherence of proteins, causes a quickly progressing accumulation of dirt on the see-through area. This problem is known from windshields, for example. However, similar issues also occur in the case of mud and quickly adhering dirt and/or leaves, which are all difficult to remove or difficult to clean with known cleaning devices.

SUMMARY

Hence, one object of the invention is to propose a roof module and/or a panel component of a motor vehicle that avoids the disadvantages of the known state of the art described above and in particular enables an effective cleaning of a see-through area of an environment sensor and/or a see-through area of a panel component.

Another object of the present invention is to provide a method for cleaning a see-through area that enables effective cleaning.

A solution is offered by a roof module according to the teaching of claim 1 and a method according to the teaching of claim 14.

Advantageous embodiments of the invention are the subject matter of the dependent claims.

The roof module according to the invention for forming a vehicle roof on a motor vehicle comprises a panel component, which at least partially forms a roof skin of the vehicle roof and serves as an outer sealing surface of the roof module. The roof module comprises at least one sensor module comprising at least one environment sensor configured to send and/or receive electromagnetic signals through a see-through area in order to detect a vehicle environment. Furthermore, the roof module comprises a controller and at least one cleaning device comprising at least one cleaning nozzle configured to clean the see-through area. The roof module according to the invention is characterized in that the at least one environment sensor is further configured to detect at least one object moving toward the see-through area in the form of image data. The controller is configured to obtain or generate at least one object information from the acquired image data and to prompt the at least one cleaning nozzle to discharge a cleaning fluid (e.g., in the form of a fluid cone or a fluid jet) based thereon.

The method according to the invention for (in particular actively and/or preventively) cleaning a see-through area of an environment sensor comprised in a roof module for forming a vehicle roof of a motor vehicle comprises at least the following steps: sending and/or receiving electromagnetic signals for detecting a vehicle environment; detecting at least one object moving toward the see-through area in the form of image data; generating at least one object information from the acquired image data; and actuating at least one cleaning nozzle to discharge a cleaning fluid (e.g., in the form of a fluid cone or a fluid jet) based on the at least one object information generated.

Furthermore, the object according to the invention is attained by a cleaning system comprising a panel component of a motor vehicle, at least one environment sensor, a controller, and at least one cleaning device. The panel component preferably serves as an outer sealing surface of the motor vehicle. The panel component can be any body part, a headlight cladding and/or a window pane (e.g., a windshield, a side window and/or a rear window) of the motor vehicle. The panel component has a (preferably at least partially transparent) see-through area, through which the environment sensor can send and/or receive electromagnetic signals and thus detect a vehicle environment. The at least one cleaning device comprises at least one cleaning nozzle configured to clean the see-through area. The cleaning system according to the invention is characterized in that the at least one environment sensor is further configured to detect at least one object moving toward the see-through area in the form of image data. The controller is configured to obtain or generate at least one object information from the acquired image data and to prompt the at least one cleaning nozzle to discharge a cleaning fluid (e.g., in the form of a fluid cone or a fluid jet) based thereon.

Of course, the dependent claims and/or the exemplary embodiments referring to the roof module equivalently relate to the method according to the invention and also to the cleaning system according to the invention without having to be mentioned separately in each context.

The roof module according to the invention, the method according to the invention and the cleaning system according to the invention are particularly advantageous since the at least one environment sensor is also used for early detection of approaching potential dirt. To this end, the environment sensor detects the vehicle environment preferably at high resolution, which allows the environment sensor to detect even smallest particles of few millimeters in diameter. The at least one environment sensor detects the vehicle environment in the form of electromagnetic signals, which are preferably transmitted to the controller in the form of (pixel-related) image data. The controller is preferably configured to detect the at least one approaching object by image evaluation (e.g., grayscale-based edge detection) of the acquired image data and identify at least one object information on said object. To this end, the controller can, for example, compare multiple sets of sensor image data detected in succession in such a manner that it can extract respective relative changes in size of the object between the detected sets of image data, from which a relative speed of the object in the direction of the at least one environment sensor can be determined taking into account the image acquisition sequence. In response to the approaching object (the potential dirt), the controller instructs the at least one cleaning nozzle to discharge the cleaning fluid to thus prevent the object from colliding with and/or adhering to the see-through area. Thus, the see-through area can be freed significantly faster and/or even kept free from dirt, such as the at least one object. This increases the efficiency and the effectiveness of the cleaning according to the invention. Moreover, the cleaning according to the invention makes it possible for a heavy accumulation of dirt on the see-through area to be prevented or at least for the time for which dirt remains on the see-through area to be shortened to the extent that the dirt can no longer adhere to the see-through area. The object-specific cleaning can additionally reduce a consumption of cleaning fluid since heavy accumulations of dirt no longer occur, which means that a clean state of the see-through area can be ensured with less cleaning fluid. According to the invention, an occurrence of disturbances due to dirt in the field of view of the environment sensor can thus be prevented. The environment sensor thus has a free and low-interference view of the vehicle environment at all times, enabling constant sensor availability and an improved precision of detection to be ensured according to the invention.

Especially if the at least one object is an insect, the invention has the advantage that such an insect can be deflected by the cleaning fluid upon, after or prior to its collision with the see-through area. Thus, the insect is not killed by the collision; instead, it is merely diverted on its trajectory. Hence, the invention is also advantageous from the perspective of nature conservation.

So in other words, a time for cleaning or for keeping the see-through area of the environment sensor (such as a camera sensor, a lidar sensor and/or a radar sensors) free can be shorted according to the invention since an approaching object is detected early, namely during its approach phase upon, after or prior to its collision with the see-through area by means of an object-specific control of the cleaning device. The at least one cleaning nozzle can preferably be controlled object-specifically and thus be employed in a coordinated manner. This allows the cleaning (fluid, fluid jet nozzle, air jet nozzle) to be activated early in close relation to the impact of the dirt or even prior to the impact of the dirt. Thus, an adherence of the dirt is prevented or reduced or the dirt is at least removed or reduced after a very short time.

The controller is preferably configured to extract or evaluate object-specific information, i.e., the at least one object information, from the image data to thus ensure an object-specific control of the at least one cleaning nozzle. Basically any type of object information can be extracted from the image data (by the controller) as long as this information is suitable for preferably object-specifically prompting the at least one cleaning nozzle to discharge the cleaning fluid. In the simplest case, the at least one object information can merely comprise an information that the detected object is a potential dirt particle with predetermined probability without defining the type and the quality of the object more closely. In abstract image processing, object recognition methods serve to differentiate certain objects or patterns from other objects. To this end, the object to be detected is preferably mathematically described first. Frequently used methods of image processing are edge detection, transformations, and size and color detection. The more precisely the object can be described and the more evaluable information is present, the more reliable the object recognition. Of course, the controller can basically be installed anywhere in the roof module according to the invention or the cleaning system according to the invention. For example, the controller can be part of the sensor module. In principle, however, the controller can also be located anywhere else in the motor vehicle.

"At least one sensor module" means that the roof module can comprise one or more than one sensor module. "At least one environment sensor" means that the roof module can comprise one or more than one environment sensor. "At least one cleaning device" means that the roof module can comprise one or more than one cleaning device. "At least one cleaning nozzle" means that the roof module can comprise one or more than one cleaning nozzle.

The field of view of the at least one environment sensor preferably extends symmetrically around an optical axis of the environment sensor in the shape of a cone having a sensor-specific cone opening angle. The at least one environment sensor is preferably configured to detect the vehicle environment in the form of image data, the environment sensor also detecting the at least one object as part of these image data according to the invention. So the environment sensor does not generate image data specifically for the object; instead, it detects the at least one object as part of the vehicle environment to be detected.

The roof module or the cleaning system preferably comprises at least two cleaning nozzles, which are disposed in the panel component in a movable manner and spaced apart from each other. For the purpose of cleaning, the roof module can further have one or more than one hose line and/or a tank for cleaning liquid. Alternatively, a tank for cleaning liquid for cleaning the front and/or rear windows already existing in the vehicle can be used as a reservoir for the cleaning fluid used by the cleaning device.

The roof module according to the invention can form a structural unit in which features for autonomous or semi-autonomous driving assisted by driver assistance systems are integrated and which can be placed on a vehicle body shell as a structural unit by a vehicle manufacturer. Furthermore, the roof module according to the invention can be a purely fixed roof or a roof including a roof opening system. Moreover, the roof module can be configured for use with a passenger car or a utility vehicle. The roof module can preferably be provided as a structural unit in the form of a roof sensor module (RSM), in which the environment sensors are provided, so as to be inserted into a roof frame of a vehicle body as a suppliable structural unit.

The environment sensor according to the invention can basically be configured in various ways and in particular comprise a lidar sensor, a radar sensor, an optical sensor, such as a (multi-directional) camera, and/or the like. Lidar sensors operate in a wavelength range of 905 nm or about 1550 nm, for example. The material of the roof skin and of the panel component in the see-through area should be transparent to the wavelength range used by the environment sensor and should hence be selected as a function of the wavelength range(s) used by the environment sensor.

In a preferred embodiment, the at least one object comprises a dirt particle and/or an insect and/or a snow slush particle and/or dust and/or leaves and/or a gush of water or water droplets and/or snowflakes and/or similar dirt particles or dirt related or due to the environment. So the at least one object can be a dirt, mud, grime, dust and/or oil particle or drop. The controller is preferably configured to only identify objects in the image data or to only extract objects from the image data that are moving toward the see-through area of the environment sensor since only these objects can cause a potential accumulation of dirt on the see-through area. Other objects which are located in the field of view of the environment sensor and also register in the acquired image data in principle but are not moving in the direction of the see-through area are preferably not classified as relevant objects by the controller. Of course, the controller can also identify multiple objects moving toward the see-through area.

In a preferred embodiment, the controller prompts the at least one cleaning nozzle to preferably discharge the cleaning fluid directly in the direction of the at least one object moving toward the see-through area to deflect the at least one object from the see-through area prior to, upon or after its collision with the see-through area. So the cleaning fluid is preferably discharged at the at least one object moving toward the see-through area to deflect the at least one object from the see-through area prior to, upon or after its collision with the see-through area. So this constitutes a kind of preventive cleaning since the cleaning fluid deflects the object prior to, upon or after its collision with the see-through area. The controller preferably considers the at least one object information in such a manner when actuating the at least one cleaning nozzle that the cleaning fluid strikes the object and thus diverts it from its trajectory. This enables a control of the at least one cleaning nozzle that is adequate to the object and the situation. The controller can preferably activate the cleaning nozzle even before the object moves into the fluid cone produced by the cleaning nozzle on its trajectory and is deflected by it. This avoids or at least reduces the likelihood that the object collides with and/or adheres to the see-through area since the object-specific potential dirt particle is immediately or directly transported away by the cleaning fluid.

In a preferred embodiment, the controller prompts the at least one cleaning nozzle to discharge the cleaning fluid in the direction of the see-through area to remove the at least one object from the see-through area upon or preferably immediately after its collision with the see-through area. Particularly preferably, the controller prompts the at least one cleaning nozzle to spray the cleaning fluid onto only a portion of the see-through area in which an impact of the object is to be expected based on the image-data-based object evaluation. So the cleaning fluid is sprayed or discharged onto the see-through area to clean it directly, i.e., immediately. The cleaning fluid preferably strikes the entire see-through area so that the entire see-through area is wetted with the cleaning fluid and can thus be cleaned. When the object strikes the see-through area, it can be washed away directly after its impact as a result of the cleaning fluid sprayed onto the see-through area so that it cannot adhere to the see-through area. Thus, it is possible, for example, to also effectively prevent accumulations of dirt that can be caused by insects (the collision with insects) since there is no time for proteins from an insect body to coagulate and thus cake on the see-through area after the collision. It can also be possible, for example, for a cleaning nozzle to be actively directed at the see-through area to spray the cleaning fluid directly onto the see-through area and for another cleaning nozzle to be directed in such a manner that it tries to deflect the object with the cleaning fluid prior to its impact on the see-through area. If the cleaning fluid misses the object itself or fails to deflect it, it can be washed away by the cleaning fluid directly on the see-through area.

In a preferred embodiment, the controller prompts the at least one cleaning nozzle to discharge the cleaning fluid in the direction of the see-through area before the at least one object collides with it to prevent the at least one object from colliding with the see-through area. A cleaning nozzle that is activated prior to an impact of the object (the potential dirt) and sprays cleaning fluid onto at least a portion of the see-through area effectively prevents an impact and/or an adherence of the object since the latter can be directly washed away. Moreover, the already active cleaning jet or fluid cone directed at at least a portion of the see-through area can deflect the approaching object in advance prior to impact and therefore prevents it from striking the see-through area. The object is basically blown away and/or sprayed away and thus diverted from its trajectory.

In a preferred embodiment, the controller is configured to prompt the at least one cleaning nozzle to discharge the cleaning fluid from the at least one cleaning nozzle in a pulsed and/or clocked manner and/or in the form of a pressure surge and/or at least temporarily as a continuous fluid flow. This makes it possible for an amount of required cleaning fluid to be saved. The pulsed and/or clocked discharge of the cleaning fluid and/or the discharge of the cleaning fluid in the form of a pressure surge can be controlled in such a manner that cleaning fluid is discharged from the at least one cleaning nozzle at successive intervals. The cleaning fluid will receive an impulse which is sufficient to deflect the at least one object. In the case of a plurality of objects, the individual pulsed cleaning jets can each strike and deflect one object, for example.

In a preferred embodiment, the controller is configured to control an amount of a fluid volume of the cleaning fluid to be discharged, in particular object-specifically based on the at least one object information. For example, more cleaning fluid can be discharged when a large object is approaching the see-through area than when a very small object is approaching since the deflection of a larger object requires a greater (mass-dependent) impulse. A volume-dependent control of the cleaning fluid has the advantage that cleaning fluid can be saved. Since the volume-dependent control is preferably object-specific, i.e., the at least one object information is taken into account in the control, a highly precise and effective cleaning can still be ensured.

In a preferred embodiment, the at least one cleaning nozzle is disposed in front of and preferably outside of a field of view of the at least one environment sensor on the panel component with respect to a line of sight of the at least one environment sensor. While the position of the at least one cleaning nozzle outside of the field of view is desirable and advantageous, it is not absolutely necessary. In principle, the at least one cleaning nozzle can also be disposed in the field of view of the environment sensor. For example, the at least one cleaning nozzle can be disposed to the right and/or to the left of the at least one environment sensor with respect to the line of sight of the at least one environment sensor.

In a preferred embodiment, the at least one cleaning nozzle is disposed on the panel component in a rotationally and/or translationally movable manner and/or has multiple settable spraying directions (i.e., main directions of the spraying cones), and the controller is preferably configured to move the at least one cleaning nozzle and/or set predetermined or selected spraying directions or activate them as a function of the at least one object information, i.e., in a preferably object-specific manner. Such a movable configuration of the cleaning nozzle preferably allows it to be actuated in an object-specific manner to direct the cleaning fluid at the object or at the see-through area in an object-specific manner. For example, such a movable cleaning nozzle makes it possible to spray only a portion of the see-through area with cleaning fluid since the cleaning nozzle is directed at said portion in this case. Basically any type of kinematics can be employed for this purpose. However, it is advantageous for the controller to be able to individually set the individual degrees of freedom of movement of the cleaning nozzle so as to thus ensure as comprehensive a controllability as possible.

In a preferred embodiment, the at least one object information comprises an information on a speed and/or a position and/or a size of the object and/or an information on a nature of the object and/or an information on a time to collision of the at least one object with the see-through area and/or an information as to whether active and/or preventive and/or subsequent action is required. In principle, other types of object information are possible as long as the controller can determine them from the image data by image-data-based object recognition. To this end, a plurality of evaluation algorithms which can extract different object parameters from the image data can be employed. For example, the controller can evaluate individual sets of time-based image data or image sequences (over time) in order to determine different pieces of object information. For example, reference objects can be stored online or offline in a database which the controller can access in order to execute comparative evaluations. The controller, together with the at least one environment sensor, thus serves to detect incoming, i.e., approaching, insects, mud, snow and/or other types of dirt and/or particles and to output at least one object-specific information each, which comprises, for example, an information on the nature of the approach (whether the object is approaching or not), a speed, a position, a size and/or a type of the dirt or a type of the particle, an estimated time to collision or an object-dependent preference for active and/or preventive and/or timely activation of the cleaning.

In a preferred embodiment, an algorithm enabling or implementing machine learning and/or a similar object recognition, in particular simulating a neural network, is implemented on a storage and execution unit of the controller. The storage and execution unit is preferably configured to determine the at least one object information from the acquired image data and/or (e.g., lidar and/or radar and/or ultrasonic) sensor data (e.g., point clouds and/or detection images) by machine learning (i.e., based on artificial intelligence) and/or similar evaluation and/or decision methods. In principal, an analytic model for evaluating or determining the at least one object information from the acquired image data can be used, as well. For example, an evaluation or determination for the purpose of individual object recognition can take place by determining a degree of obstruction and/or transparency and/or an at least partial obscuration and/or shading. So the image-data-based object recognition of the controller is preferably performed on the basis of artificial intelligence or on the basis of machine learning. In this context, software-based methods for object recognition, which are based, for example, on the approaches of machine learning or deep learning, can be employed. For the machine learning approaches, it is preferred for characteristics to be defined first and then for a technology such as a support vector machine (SVM) to be used to classify the objects.

Known approaches of machine learning are the Viola Jones method, which is based on Haar wavelets, the scale-invariant feature transform (SIFT) method, the speeded up robust features (SURF) method, and the histogram of oriented gradients (HOG) method. Approaches of deep learning are mostly based on a convolutional neural network (CNN). Such an artificial neural network has preferably been trained prior. This requires large amounts (>100) of image data. These image data used for training have preferably been classified in some form before so that the training image data already contain an information as to what is depicted in the image in question.

In a preferred embodiment, the present invention relates to a motor vehicle comprising a roof module according to the invention. In a preferred embodiment, the present invention relates to a motor vehicle comprising a cleaning system according to the invention.

Basically any type of environment sensor can be installed in the roof module or employed in the cleaning system. The use of lidar sensors and/or radar sensors and/or camera sensors and/or multi-camera sensors and/or ultrasonic sensors is particularly advantageous.

Of course, the embodiments and the illustrative examples mentioned above and yet to be discussed below can be realized not only individually but also in any combination with each other without departing from the scope of the present invention. Moreover, any and all embodiments and illustrative examples of the roof module also relate to a motor vehicle having such a roof module and to the method according to the invention. Moreover, any and all embodiments and illustrative examples of the cleaning system also relate to a motor vehicle having such a cleaning system.

An embodiment of the invention is schematically illustrated in the drawing and will be discussed in more detail below.

BRIEF DESCRIPTIONS OF THE DRAWINGS

DETAILED DESCRIPTION

Figure 1:
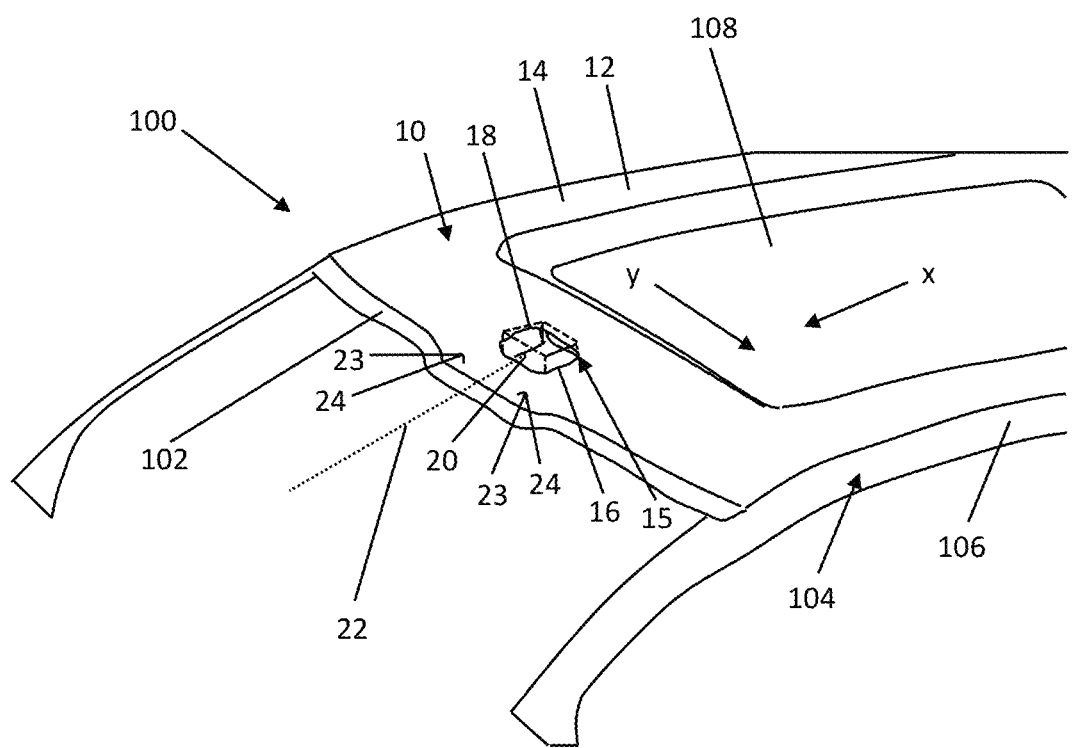
FIG. 1 is a perspective view of a vehicle roof comprising a roof module according to the invention.

FIG. 1 shows a vehicle roof 100 of a motor vehicle (not shown in full). The vehicle comprises a roof module 10. Roof module 10 is inserted into a roof frame 104 of the vehicle, i.e., placed on top of two transverse rails 102 and two longitudinal rails 106 (only one of which is visible in each case), as a structural unit. The two transverse rails 102 and the two longitudinal rails 106 (only one of which is visible in each case) form roof frame 104. In the illustrative example shown, roof module 10 has a panoramic roof 108.

Roof module 10 comprises a panel component 12 for forming a roof skin 14 of vehicle roof 100. In principle, the panel component can also be any other body part, a headlight cladding and/or a window of the motor vehicle. A sensor module 15 comprising an environment sensor 16 is disposed symmetrically to the longitudinal vehicle axis in a front area of vehicle roof 100 or roof module 10 (with respect to a longitudinal vehicle direction x). Environment sensor 16 is disposed directly behind a front transverse rail 102, which defines a roof header of the vehicle. Environment sensor 16 is disposed in a sensor housing 18, by which environment sensor 16 is disposed in an opening (not shown) in roof skin 14 of roof module 10 on a frame structure in a retractable and deployable manner (or mounted thereon in a rotatable manner). Alternatively, environment sensor 16 and sensor housing 18 can also be mounted rigidly on an outer surface of roof skin 14 or on panel component 12. Environment sensor 16 is disposed in the interior of sensor housing 18. Sensor housing 18 forms a dry area, in which environment sensor 16 is disposed in a moisture-proof manner. In the case at hand, environment sensor 16 is a lidar sensor. However, other sensor types, such as radar sensors, (multi-directional) cameras or ultrasonic sensors, which are used for (semi-)autonomous driving can be employed, as well.

Environment sensor 16 or sensor housing 18 of environment sensor 16 comprises a see-through area 20, which can be made of a preferably shatter-proof plastic or another (semi-)transparent material, for example. Environment sensor 16 is configured to detect a vehicle environment within a field of view 21 (see FIG. 2) in the form of electromagnetic signals and is oriented along an optical axis 22, which is parallel to longitudinal vehicle direction x in the case of FIG. 1.

Roof module 10 according to the invention further comprises at least one cleaning device 23, which comprises at least one cleaning nozzle 24, which is configured to clean see-through area 20. In the case at hand, roof module 10 is provided with two cleaning nozzles 24 (see FIG. 1), each of which is supplied with a cleaning fluid (such as a liquid, e.g., water, or a gas) via a supply channel 25. The cleaning fluid can be soapy water, for example. Alternatively, cleaning with pressurized air or another pressurized gas is possible. When the cleaning fluid exits cleaning nozzles 24, respective fluid cones 26 or cleaning jets are produced. Cleaning nozzle 24 can be oriented in such a manner that fluid cone 26 strikes see-through area 20 and cleans it (see FIG. 2).

Figure 2:
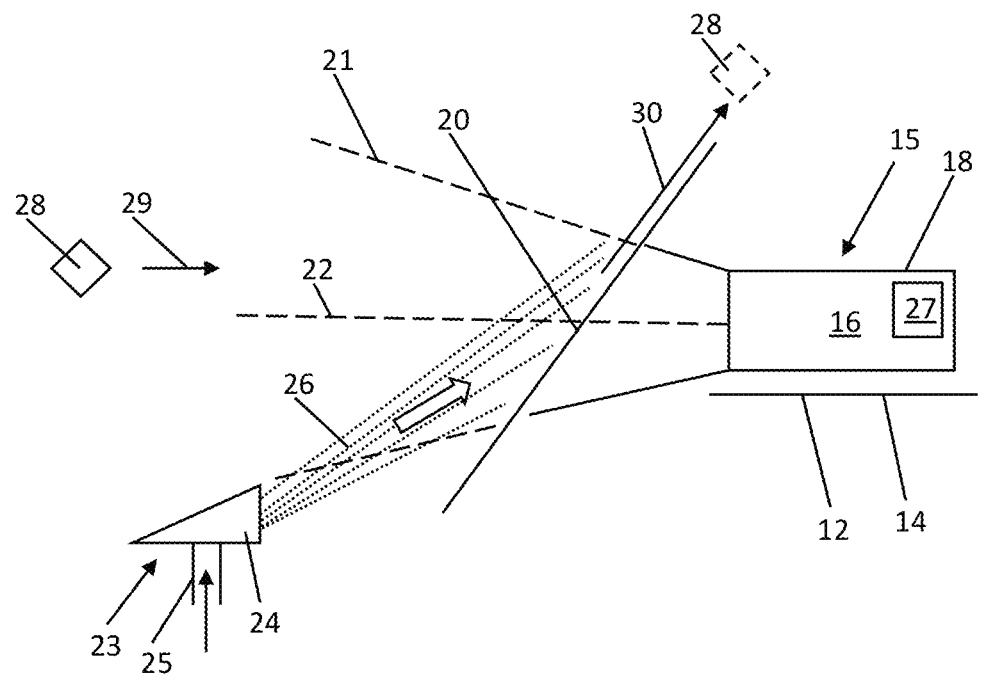
FIG. 2 is a schematic illustration of a first exemplary embodiment of the roof module according to the invention.

According to the invention, sensor module 15 comprises a controller 27. In the case of FIG. 2, controller 27 is schematically disposed within sensor housing 18. Alternatively, however, controller 27 can be disposed in a different area of roof module 10 outside of the sensor housing. Controller 27 can be the controller of the at least one environment sensor, for example, which also evaluates the image data of the vehicle surroundings, i.e., the vehicle environment, to enable the vehicle to drive (semi-)autonomously. Controller 27 can comprise a memory, a processor, a cache and other components of a computer. In the simplest case, controller 27 can be a type of single-chip computer (system on a chip). Controller 27 can further comprise a storage and evaluation unit.

According to the invention, the at least one environment sensor 16 is configured to detect at least one object 28 moving toward see-through area 20 in the form of image data. For example, object 28 can be a dirt particle and/or an insect and/or a snow slush particle or another type of dirt particle moving toward see-through area 20 along an object main trajectory 29.

Controller 27 is configured to determine or generate at least one object information (e.g., a relative speed of object 28 relative to the vehicle or see-through area 20) from the image data. Based on the at least one object information, controller 27 will prompt the at least one cleaning nozzle 24 to discharge the cleaning fluid in the form of fluid cone 26 or a fluid jet. Thus, controller 27 controls cleaning nozzle 24 to object-specifically discharge cleaning fluid to thus prevent the object from adhering to the see-through area. When controller 27 activates the at least one cleaning nozzle 24, the latter is prompted to discharge the cleaning fluid. The discharge can also take place in pulsed and/or clocked form and/or in a volume-controlled manner. So controller 27 is preferably configured to receive and evaluate signals (in the form of image data) of the at least one environment sensor and to actuate cleaning device 23, in particular the at least one cleaning nozzle 24, optimally in a given situation.

For example, controller 27 prompts the at least one cleaning nozzle 24 to discharge the cleaning fluid in the direction of see-through area 20 to remove the at least one object 28 from see-through area 20 as immediately as possible upon or even prior to or after its collision with see-through area 20 (see FIG. 2). Object 28 thus removed is deflected from see-through area 20 in a deflection direction 30 and can therefore not adhere to see-through area 20. Object 28 thus deflected by fluid cone 26 or the fluid jet is schematically shown once more in FIG. 2 by dashed lines after its deflection. Thus, an accumulation of dirt on see-through area 20 can be prevented.

Figure 3:
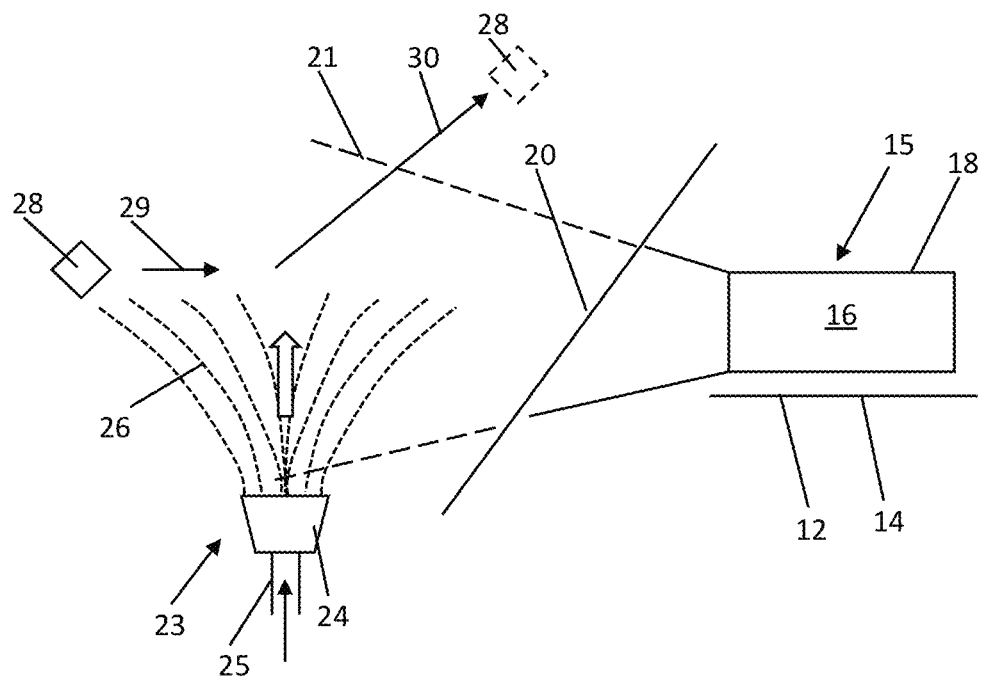
FIG. 3 is a schematic illustration of a second exemplary embodiment of the roof module according to the invention.

For example, controller 27 prompts the at least one cleaning nozzle 24 to discharge the cleaning fluid onto the at least one object 28 moving toward see-through area 20 in order to deflect the at least one object 28 from see-through area 20 in a deflection direction 30 prior to its collision with see-through area 20 (see FIG. 3). Object 28 thus deflected by fluid cone 26 or fluid jet is schematically shown once more in FIG. 3 by dashed lines after its deflection. Thus an accumulation of dirt on see-through area 20 can be prevented preemptively. In other words, the at least one environment sensor 16 detects one or more than one piece of dirt and/or one or more than one particle (such as an insect, mud, dirt and/or snow) approaching a field of view 21 and moving toward see-through area 20 on object main trajectory 29. The early detection of object 28 allows controller 27 to activate cleaning nozzle 24 early, to which end the at least one cleaning nozzle 24 is supplied with the cleaning fluid via supply channel 25. So the fluid jet is activated and cleans see-through area 20 early, i.e., prior to the collision of object 28 with see-through area 20. The result is a quick and effective cleaning or avoidance or reduction of an accumulation of dirt on see-through area 20. This makes an improved sensor performance possible by avoiding dirt-related disturbances.

The invention claimed is:

1. A roof module for forming a vehicle roof on a motor vehicle, the roof module comprising:
 a panel component which at least partially forms a roof skin of the vehicle roof and serves as an outer sealing surface of the roof module,
 at least one sensor module comprising at least one environment sensor configured to send and/or receive electromagnetic signals through a see-through area in order to detect a vehicle environment, a controller, and
 at least one cleaning device comprising at least one cleaning nozzle configured to clean the see-through area,
 wherein the at least one environment sensor is configured to detect an object moving toward the see-through area in the form of image data, and the controller is configured to generate at least one object information from the image data and to prompt the at least one cleaning nozzle to discharge a cleaning fluid based thereon.

2. The roof module according to claim 1, wherein the at least one object comprises a dirt particle and/or an insect and/or a snow slush particle and/or dust and/or leaves and/or a gush of water or water droplets and/or snow flakes and/or similar dirt particles related or due to the environment.

3. The roof module according to claim 1, wherein the controller prompts the at least one cleaning nozzle to discharge the cleaning fluid onto the at least one object moving toward the see-through area to deflect the at least one object from the see-through area upon, prior to or after its collision with the see-through area.

4. The roof module according to claim 1, wherein the controller prompts the at least one cleaning nozzle to discharge the cleaning fluid in the direction of the see-through area to remove the at least one object from the see-through area prior to, upon or after its collision with the see-through area.

5. The roof module according to claim 1, wherein the controller prompts the at least one cleaning nozzle to discharge the cleaning fluid in the direction of the see-through area before the at least one object collides with the see-through area to prevent the at least one object from colliding with the see-through area.

6. The roof module according to claim 1, wherein the controller is configured to prompt the at least one cleaning nozzle to discharge the cleaning fluid from the at least one cleaning nozzle in a pulsed manner and/or in the form of a pressure surge and/or at least temporarily as a continuous fluid flow.

7. The roof module according to claim 1, wherein the controller is configured to control an amount of a fluid volume of the cleaning fluid to be discharged on the basis of the at least one object information.

8. The roof module according to claim 1, wherein the at least one cleaning nozzle is disposed in front of and outside of a field of view of the environment sensor on the panel component with respect to a line of sight of the environment sensor.

9. The roof module according to claim 1, wherein the at least one cleaning nozzle is disposed on the panel component in a rotationally and/or translationally movable manner and/or has multiple settable spraying directions, and the controller is configured to move the at least one cleaning nozzle and/or set predetermined spraying directions of the multiple settable spraying directions as a function of the at least one object information.

10. The roof module according to claim 1, wherein the at least one object information comprises information on a speed and/or a position and/or a size of the object and/or information on a nature of the object and/or information on a time to collision of the at least one object with the see-through area and/or information as to whether active and/or preventive and/or subsequent action is required.

11. The roof module according to claim 1, wherein an algorithm enabling machine learning is implemented on a storage and execution unit of the controller, and the storage and execution unit is configured to determine the at least one object information from the acquired image data by machine learning.

12. The roof module according to claim 1, wherein the at least one environment sensor comprises a lidar sensor and/or a radar sensor and/or a camera sensor and/or a multi-camera sensor and/or an ultrasonic sensor.

13. A motor vehicle comprising a roof module according to claim 1.

14. A method for cleaning a see-through area of an environment sensor comprised in a roof module for forming a vehicle roof of a motor vehicle, the method comprising:
 sending and/or receiving electromagnetic signals to detect a vehicle environment;

detecting at least one object moving toward the see-through area in the form of image data; generating at least one object information from the acquired image data; and actuating at least one cleaning nozzle based on the at least one object information generated so that it discharges a cleaning fluid.

* * * * *